United States Patent

Eggstein

[15] 3,656,413
[45] Apr. 18, 1972

[54] FLUID-OPERATED SERVOMOTOR

[72] Inventor: Giorgio Eggstein, San Remo, Italy

[73] Assignee: Ernst Heinkel Aktiengesellschaft, Stuttgart-Zuffenhausen, Germany

[22] Filed: Dec. 24, 1969

[21] Appl. No.: 888,090

Related U.S. Application Data

[63] Continuation-in-part of Ser. No. 707,734, Feb. 23, 1968, abandoned.

[52] U.S. Cl. .............................................. 92/98 D, 92/99
[51] Int. Cl. .................................... F01b 19/00, F16j 3/00
[58] Field of Search .................. 92/99, 100, 98, 98 RD, 101, 92/98 D; 91/369, 369 A, 369 B

[56] References Cited

UNITED STATES PATENTS

| | | | |
|---|---|---|---|
| 2,170,574 | 8/1939 | Sauzedde | 92/99 |
| 2,574,700 | 11/1951 | Knauss | 92/98 X |
| 2,612,419 | 9/1952 | Reynolds | 92/98 X |
| 2,742,785 | 4/1956 | St. Clair | 92/99 |
| 2,969,046 | 1/1961 | Kellogg et al. | 92/98 X |
| 2,972,983 | 2/1961 | Ayers, Jr. | 92/99 X |
| 2,989,033 | 6/1961 | Stelzer | 92/99 X |
| 3,026,853 | 3/1962 | Stelzer | 92/99 X |
| 3,057,332 | 10/1962 | Kellogg et al. | 92/98 R |
| 3,109,346 | 11/1963 | Julow | 92/98 |
| 3,152,518 | 8/1964 | Ayers, Jr. | 92/99 X |
| 3,200,717 | 8/1965 | Einsiedler | 92/99 X |
| 3,386,345 | 6/1968 | Taplin | 92/99 |

Primary Examiner—Edgar W. Geoghegan
Assistant Examiner—Irwin C. Cohen
Attorney—Michael S. Striker

[57] ABSTRACT

Pneumatic servomotor which operates the master cylinder in a vehicle brake applying apparatus comprises a two-piece cylinder for a piston and a diaphragm. The beaded marginal portion of the diaphragm has a maximum diameter which equals the internal diameter of the cylindricsl wall of the cylinder and is sealingly clamped between the sections of the cylinder. Each section has lugs which are bent over the other section to hold the sections together.

8 Claims, 4 Drawing Figures

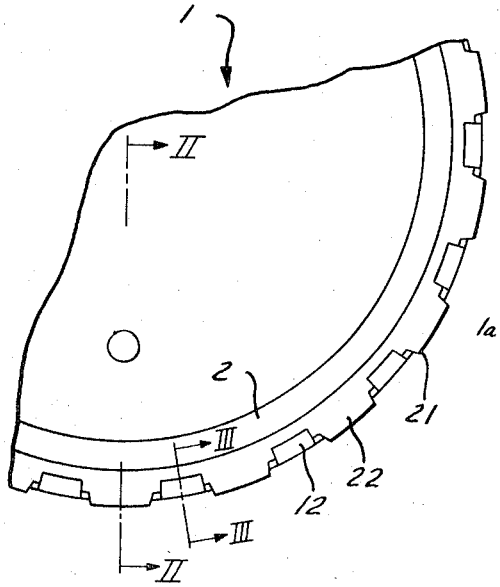
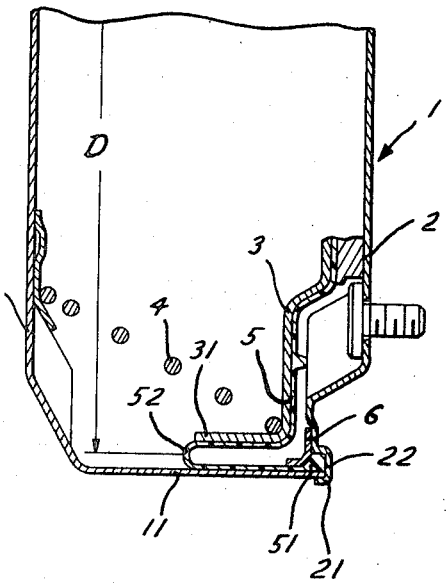
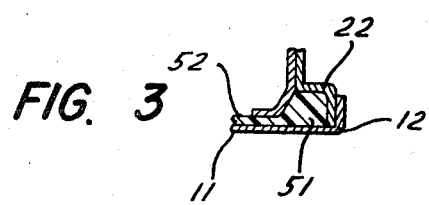
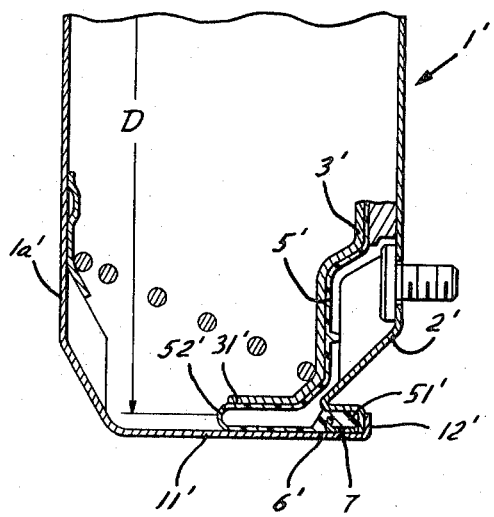
INVENTOR.
GIORGIO EGGSTEIN

FLUID-OPERATED SERVOMOTOR

CROSS-REFERENCE TO RELATED APPLICATION

This is a continuation-in-part of my application Ser. No. 707,734 filed Feb. 23, 1968 and now abandoned.

BACKGROUND OF THE INVENTION

The present invention relates to improvements in pneumatic servomotors, particularly to servomotors of the type which are actuated by means of vacuum-to-atmospheric pressure differential and may be utilized as a booster unit for operation of the master cylinder in a vehicle brake applying apparatus. Still more particularly, the invention relates to improvements in the design and assembly of cylinders or shells with pistons and diaphragms in such servomotors.

Servomotors for master cylinders of vehicle brake applying apparatus are normally operated by vacuum in the air intake of the engine. Such servomotors comprise a cylinder or shell of sheet metal accommodating an axially movable piston or diaphragm plate of sheet metal. A force transmitting member connects the piston with the hydraulic master cylinder of the brake applying apparatus. As a rule, the piston resembles a dish and is sealingly connected with the central portion of a flexible diaphragm whose marginal portion is sealingly secured to the cylinder. Suitable valves are employed to regulate the pressure in response to axial displacement of the piston on application or termination of foot pressure against the brake pedal.

In conventional servomotors, the marginal portion of the diaphragm is provided with a bead which is clamped in a flange surrounding the periphery of the cylinder. As a rule, the cylinder comprises two sections whose marginal portions are secured to each other and form the aforementioned flange. The bead of the diaphragm is clamped between the marginal portions of the sections during assembly of the cylinder. Reference may be had to U.S. Pat. No. 2,742,785 to St. Clair, U.S. Pat. No. 2,969,046 to Kellogg et al. and U.S. Pat. No. 3,026,853 to Stelzer. Such mode of affixing the diaphragm to the cylinder provides a satisfactory sealing action. However, the flange increases the diameter of the cylinder without permitting a commensurate increase in the diameter of the piston. Since the space in an automotive vehicle is at a premium, it is highly desirable to take full advantage of the space occupied by the cylinder of the servomotor, i.e., to design the servomotor in such a way that the external diameter of its cylinder exceeds negligibly the diameter of the piston therein. Of course, such desirable ratio of the two diameters should not affect movements of the diaphragm which must be free to fold itself over the internal surface of the cylinder in all axial positions of the piston.

SUMMARY OF THE INVENTION

It is an object of my invention to provide a fluid-operated servomotor which is particularly suited for use as a booster for operating the master cylinder in a vehicle brake applying apparatus and to construct and assemble the parts of the servomotor in such a way that it can furnish a force considerably exceeding the force furnished by a conventional servomotor which occupies the same amount of space in an automotive vehicle.

Another object of the invention is to provide a servomotor wherein the effective diameter of the piston exceeds considerably the effective diameters of pistons in conventional servomotors whose cylinders occupy the same amount of space as the cylinder of my servomotor.

A further object of the invention is to provide a novel connection between the sections of a cylinder in a pneumatic servomotor for use in braking apparatus of automotive vehicles and to provide a novel connection between the sections and the marginal portion of the diaphragm.

An additional object of the invention is to provide a servomotor which can be utilized in presently known vehicle brake applying apparatus.

The improved servomotor comprises a cylinder including a first cover section having a cylindrical wall and a second cover section secured to one end of the cylindrical wall, a piston reciprocably received with clearance in the cylindrical wall of the first cover section, and a diaphragm having a median or central portion secured to one side of the piston and a preferably beaded annular marginal portion clamped between the two sections of the cylinder. The maximum diameter of the marginal portion of the diaphragm approximates and preferably equals the internal diameter of the cylindrical wall on the first cover section. An annular clamping member is provided on the cylindrical wall to press the marginal portion of the diaphragm against the second cover section, or vice versa. The two sections are preferably provided with annuli of alternating lugs or analogous projections. The lugs of one section are bent over the other section, and vice versa, to provide a reliable connection between the two sections.

The novel features which are considered as characteristic of the invention are set forth in particular in the appended claims. The improved servomotor itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary end elevational view of a servomotor which embodies one form of my invention;

FIG. 2 is an axial sectional view as seen in the direction of arrows from the line II—II of FIG. 1;

FIG. 3 is a fragmentary axial sectional view as seen in the direction of arrows from the line III—III of FIG. 1; and FIG. 4 is a fragmentary axial sectional view of a modified servomotor.

DESCRIPTION OF THE PREFERRED EMBODIMENTS

Referring first to FIGS. 1 to 3, there is shown a portion of a pneumatic servomotor which comprises a two-piece cylinder or shell 1, a dish-shaped piston or diaphragm retainer 3, a spring 4, and a flexible diaphragm 5. The cylinder 1 comprises two sections or covers including a front cover 1a having a cylindrical wall 11 and a rear cover or cap 2 which is sealingly connected with one end of the cylindrical wall 11. The piston 3 comprises a cylindrical marginal portion 31 which is closely adjacent to the internal surface of the cylindrical wall 11. The spring 4 tends to bias the piston 3 in a direction to the right, as viewed in FIG. 2, i.e., toward the inner side of the cap 2. The median portion of the diaphragm 5 overlies the central portion of the piston 3 at that side of the piston which faces the cap 2, and the diaphragm comprises a beaded marginal portion 51 which is sealingly clamped between the cylindrical wall 11 and the adjacent marginal portion of the cap 2. The maximum diameter of the diaphragm 5 does not exceed the internal diameter of the cylindrical wall 11. An annular fold 52 of the diaphragm 5 overlies the internal surface of the wall 11 and this fold rolls itself onto or off the internal surface of the wall 11 when the piston 3 is caused to move axially with reference to the cylinder 1. The fold 52 also overlies the external surface of the marginal portion 31, at least when the piston 3 assumes the axial position shown in FIG. 2.

The cap 2 is connected with a profiled annular clamping member 6. During assembly of the cylinder 1, the marginal portion 51 of the diaphragm 5 is introduced into the space between the clamping member 6 and the adjoining annulus of marginal projections or lugs 22 on the cover 2, and this marginal portion is sealingly clamped between the cap 2 and the adjoining internal surface of the wall 11 when the assembly of the cylinder is completed. Each projection 22 has a bent-over tip 21 which overlies the outer side of the cylindrical wall 11 (see FIG. 2). The slots between the projections 22 of the cap 2 receive bent-over projections or lugs 12 at the right-hand end of the cylindrical wall 11, and the projections 12 overlie the outer side of the cap 2 in a manner as shown in FIGS. 1 and 3. Such connection between the sections 1a and 2 provides a fluidtight seal at the open end of the cylindrical wall 11 and insures that the marginal portion 51 of the diaphragm is properly clamped between the cap 2 and wall 11.

FIG. 4 illustrates a portion of a modified servomotor wherein the parts are denoted by numerals similar to those employed in FIGS. 1 to 3 but each followed by a prime. The cylinder 1' includes a front cover section 1a' having a cylindrical wall 11' which is connected with the marginal portion of the cap 2'. The lugs or projections 12' of the wall 11' overlie the outer side of the cap 2' and the latter abuts against one end face of a profiled annular clamping member 6' which is welded or otherwise secured to the internal surface of the wall 11' and has a portion which penetrates into the beaded marginal portion 51' of the diaphragm 5'. The fold of the diaphragm is shown at 52' and the cylindrical marginal portion of the piston 3' at 31'. The numeral 7 denotes a welded seam which connects the clamping member 6' to the cylindrical wall 11'.

The effective diameter D of the piston 3 or 3' corresponds to the diameter of the median portion of the fold 52 or 52'. It will be seen that the diameter D is only slightly less than the maximum diameter of the cylinder 1 or 1'. This is achieved by omitting the aforementioned external flange which is employed on the cylinders of conventional servomotors. As shown in FIGS. 2 and 4, the diameter of the external surface of the cylindrical wall 11 or 11' in my servomotor is constant from end to end. Also, the thickness of the wall 11 or 11' is constant.

The advantages of my servomotor will be readily understood upon perusal of the preceding description. The output of the improved servomotor exceeds considerably the output of a conventional servomotor without requiring more room in an automotive vehicle. The average diameter of the cylinder (not counting the flange) in a conventional servomotor is about 150 millimeters when such servomotor is used in a medium-sized automotive vehicle. The cross-sectional area of such a cylinder is about 180 cm$^2$. The radial dimension of the flange is about 16 mm, i.e., the maximum diameter of the cylinder with the flange included is about 180 mm. If the cylinder 1 or 1' of my invention has a diameter of about 180 mm, its cross-sectional area is about 260 cm$^2$. The useful or effective portions of such areas are reduced by the area between the internal surface of the cylindrical wall of the cylinder and the central portion of the fold on the diaphragm. In a conventional cylinder with a cross-sectional area is about 154 cm$^2$. In my improved servomotor, the effective cross-sectional area of the cylinder 1 or 1' (namely, the area having the diameter D) is about 232 cm$^2$. By assuming that the effective subatmospheric pressure is 0.6 atmosphere and by disregarding the reduction of the effective piston area which is due to the presence of valves, a conventional servomotor can provide a force of 93 kilograms whereas the improved servomotor furnishes a force of 138 kilograms, i.e., an increase of 48 percent which is arrived at without necessitating more room for installation of the improved servomotor. This is achieved by constructing and assembling the cylinder 1 or 1' and the diaphragm 5 or 5' in such a way that the marginal portion 51 or 51' need not extend beyond the internal surface of the cylindrical wall 11 or 11' so that the flange which is considered necessary on the cylinders of conventional servomotors can be dispensed with and that the thus saved space can be used to enlarge the effective cross-sectional area of the cylinder and piston. Also, the manufacturing cost of the cylinder is less than in presently known servomotors because the wall 11 or 11' need not be formed with a bulge to accommodated the bead 51 or 51' of the diaphragm.

Without further analysis, the foregoing will so fully reveal the gist of the present invention that others can, by applying current knowledge, readily adapt it for various applications without omitting features which, from the standpoint of prior art, fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. A servomotor, particularly a pneumatic servomotor for transmitting force to the master cylinder of a vehicle brake applying apparatus, comprising a cylinder including a first cover section having a cylindrical wall of uniform diameter throughout its length and a second cover section; a dished piston reciprocably accommodated in said cylinder; a rolling diaphragm having a central portion engaging said piston and an annular marginal portion sealingly engaging said cylinder, the maximum diameter of said diaphragm being equal to the internal diameter of said cylindrical wall; and an annular clamping member; means contained entirely within said cylinder for rigidly securing said annular clamping member to one of said sections to press the marginal portion of said diaphragm against the other section, said sections having adjacent annular portions and at least one of said annular portions being provided with bent-over projections overlying the other annular portion to thereby connect said sections to each other and to maintain said clamping member in engagement with said marginal portion, said marginal portion of said diaphragm being pressed against the connection of said adjacent annular portions.

2. A servomotor as defined in claim 1, wherein said rigid securing means is constituted by a weld seam.

3. A servomotor as defined in claim 1, wherein said one annular portion forms part of said wall.

4. A servomotor as defined in claim 1, wherein said one annular portion forms part of said second section.

5. A servomotor as defined in claim 1, wherein each of said annular portions comprises bent-over projections and wherein the projections of one of said annular portions alternate with projections of the other annular portion.

6. A servomotor as defined in claim 1, wherein said second section abuts against said clamping member.

7. A servomotor as defined in claim 1, wherein said piston comprises a cylindrical marginal portion which is closely adjacent to the internal surface of said wall.

8. A servomotor as defined in claim 1, wherein said marginal portion of said diaphragm comprises a radially inwardly extending bead adjacent to said clamping member.

* * * * *